United States Patent
Miyanabe et al.

(10) Patent No.: US 7,050,371 B2
(45) Date of Patent: May 23, 2006

(54) CROSS-TALK REMOVAL APPARATUS AND DATA REPRODUCTION APPARATUS

(75) Inventors: Shogo Miyanabe, Tsurugashima (JP); Hiroki Kuribayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 786 days.

(21) Appl. No.: 10/091,332

(22) Filed: Mar. 6, 2002

(65) Prior Publication Data
US 2002/0141306 A1 Oct. 3, 2002

(30) Foreign Application Priority Data
Mar. 29, 2001 (JP) .................... P2001-097665

(51) Int. Cl.
*G11B 7/00* (2006.01)

(52) U.S. Cl. ................ 369/47.17; 369/53.33
(58) Field of Classification Search ............. 369/47.17, 369/53.33, 53.34
See application file for complete search history.

(56) References Cited

U.S. PATENT DOCUMENTS

| | | | | |
|---|---|---|---|---|
| 6,084,837 A | * | 7/2000 | Miyanabe et al. | 369/53.33 |
| 6,330,213 B1 | * | 12/2001 | Ishibashi et al. | 369/47.26 |
| 6,442,114 B1 | * | 8/2002 | Ishibashi et al. | 369/47.17 |
| 6,680,891 B1 | * | 1/2004 | Kim et al. | 369/53.31 |
| 6,738,326 B1 | * | 5/2004 | Ishibashi et al. | 369/47.17 |

FOREIGN PATENT DOCUMENTS

JP 2000-173061 A 6/2000

* cited by examiner

*Primary Examiner*—W. R. Young
*Assistant Examiner*—Adam R. Giesy
(74) *Attorney, Agent, or Firm*—Morgan Lewis & Bockius LLP (57) ABSTRACT

A pick up irradiates light beams at specified intervals in the tangential direction of the main track to be reproduced and both of adjacent tracks on a disk 10 on which tracks are formed. A CTC unit 15 uses the delay amount Δd of the respective sample-value series corresponding to the reproduction signal RFm from the main track and reproduction signals RF1, RF2 from both adjacent tracks to correct the delay, then outputs a CTC output signal from which the cross-talk component has been removed. In addition, when adjusting the delay, the CPU 17 applies a disturbance to the control signal for the actuator of the servo-control unit 18 and changes the delay amount Δd within a specified range of change. At this time, the CPU 17 sets the delay amount Δd, which minimizes the jitter value found by the jitter detection unit 16 according to the CTC output signal, for the CTC unit 15. This makes it possible to set the optimum delay amount Δd when adjusting the delay, even when there is little steady cross-talk.

16 Claims, 7 Drawing Sheets

FIG. 2

DIRECTION OF DISK MOVEMENT

CROSS-TALK REMOVAL APPARATUS AND DATA REPRODUCTION APPARATUS

BACKGROUND OF THE INVENTION

1. Field of the Invention

This invention relates to a cross-talk removal apparatus, which removes cross-talk from adjacent tracks contained in the reproduced signal of a main track based on reproduction signals from the main track and from both adjacent tracks of a data recording medium; and to a data reproduction apparatus that uses the cross-talk removal apparatus when reproducing data from a data-recording medium that has tracks.

2. Description of the Related Art

In the case of a large-capacity data-recording medium such as DVD, there is a problem in that cross-talk from adjacent tracks affects the reproduction signal from the main track being reproduced and causes the reproduction quality to decrease. In order to solve this problem, a cross-talk canceller has gained much attention, in which three light beams are used to simultaneously reproduce three adjacent tracks in order to obtain false cross-talk from the reproduction signals of the adjacent tracks, and then the cross-talk is removed by subtracting this cross-talk from the reproduction signal from the main track.

Normally, the three light beams that are used by the cross-talk canceller irradiate positions at specified intervals along the tangent line of the tracks, so there are time differences in the reproduction signals from each of the tracks. Therefore, before removing the cross-talk, it is necessary to delay the reproduction signals from each of the tracks a specified amount in order to remove the time differences and to bring each of the reproduction signals into phase with each other.

On the other hand, the amount that the reproduction signals of each track is delayed does not always become a fixed value, and changes over time according to the changes in the wavelength of the laser or the characteristics of the data-recording medium. Therefore, by finding an optimum amount of delay for a specified timing and adjusting the delay of the cross-talk canceller, it is possible to compensate for the changes over time of the amount of delay. For example, by detecting the jitter value that corresponds to the reproduction signal, the cross-talk increases simultaneously with the increase in jitter value when the delay amount changes, so the delay amount when the jitter value is a minimum can be set for the cross-talk canceller.

Normally, when reproducing data from a data-recording medium having a very narrow track pitch and on which data have been densely recorded, there is a problem that the cross-talk steadily increases, so the effect of applying the aforementioned cross-talk canceller becomes large. However, in the case of current DVD, the track pitch is somewhat wide, so this steady cross-talk does not become so large. For example, the jitter value of the reproduction signal is affected very little by the cross-talk and the disk noise or interference between code in the tangential direction of the track becomes predominant. Therefore, when adjusting the delay of the cross-talk canceller, it is not possible to find an optimum amount of delay.

On the other hand, even when the steady cross-talk between adjacent tracks is small, the actuator may move due to defects or scratches on the surface of the disk, causing the cross-talk to increase temporarily. If the delay is not properly adjusted when this occurs, the amount of delay of the cross-talk canceller will change, and it becomes impossible to properly remove the cross-talk.

SUMMARY OF THE INVENTION

Taking the above problems into consideration, it is the objective of this invention to provide a cross-talk removal apparatus and data reproduction apparatus that very precisely removes cross-talk by intentionally increasing the cross-talk when adjusting the delay, and setting the delay to an optimum level, even when the steady cross-talk during reproduction is small.

The above object of the present invention can be achieved by the cross-talk removal apparatus of the present invention. The cross-talk removal apparatus that removes cross-talk between the reproduction signal from a main track on a data-recording medium that is to be reproduced, and one or the other or both of the reproduction signals from the adjacent tracks and is provided with: a cross-talk removal device of extracting the cross-talk from the reproduction signal of one or the other or both of said adjacent tracks after delaying the reproduction signal from said main track and reproduction signals from said adjacent tracks a specified delay amount that corresponds to the difference in the respective reproduction time, and removes said cross-talk from the reproduction signal of said main track; a disturbance application device of applying a disturbance to the control signal required for reproducing said main track in order to increase said cross-talk; and a delay adjustment device of setting an optimum delay amount according to a specified signal that corresponds to said cross-talk when said delay amount is changed after said disturbance is applied, and performing delay adjustment for said cross-talk removal device.

According to this aspect, when adjusting the delay with the cross-talk removal apparatus of the present invention, a disturbance is applied to the control signal of a pick-up actuator for example. On the other hand, a reproduction signal from the main track and a reproduction signal from another adjacent track are generated, and after these signals are delayed by the specified delay amount, the cross-talk is removed. At this time, the delay amount of each of the reproduction signals is changed while disturbance is applied, and an optimum delay amount is set within this range of change according to a specified signal. Therefore, it is possible to increase the cross-talk with disturbance, even when there is little cross-talk when reproducing data from the data-recording medium. By changing the status of the specified signal that corresponds to the change in delay amount, it possible to easily determine an optimum delay amount and then use that delay to remove any cross-talk afterwards with high precision.

In one aspect of the cross-talk removal apparatus of the present invention, said disturbance application device applies a disturbance to the control signal for a pick up when reproducing said main track.

According to this aspect, it is possible to increase cross-talk and determine an optimum delay amount by applying disturbance to the control signal of a pick-up actuator or the like when reproducing data from the main track.

In another aspect of the cross-talk removal apparatus of the present invention, said disturbance application device applies a disturbance to the control signal for a pick up when reproducing said main track and said disturbance that is applied to said control signal is of a size such that there is no loss in error-correction performance during reproduction.

According to this aspect, error correction is not lost when performing the reproduction operation together with error correction, so it is possible to adjust the delay while at the same time maintain the reproduction performance of reproducing data from the data-recording medium.

In further aspect of the cross-talk removal apparatus of the present invention, said disturbance application device applies a disturbance to the control signal for a pick up when reproducing said main track and said control signal is the control signal for a tracking servo.

According to this aspect, it is possible to increase cross-talk and determine an optimum delay amount by applying disturbance to the control signal of a tracking servo (de-track) when reproducing data from the main track.

In further aspect of the cross-talk removal apparatus of the present invention, said delay adjustment device uses the jitter value from the output signal of said cross-talk removal device as said specified signal.

According to this aspect, it is possible to simply and reliably adjust the delay by determining the jitter values of the output signals in the cross-talk removal step within the range of change of the delay amounts of each reproduction signal, and to set the delay amount, for example, to an amount that will result in the minimum jitter value.

In further aspect of the cross-talk removal apparatus of the present invention, further provided with a variable filter that uses a variably controlled n number of tap coefficients for performing filtering.

According to this aspect, cross-talk is removed by obtaining a sample series that corresponds to each reproduction signal and performing an n-tap variable filtering process, so it is easy to reference specified digital values when a disturbance is applied and to determine an optimum delay amount.

In further aspect of the cross-talk removal apparatus of the present invention, said variable filter has a switching function for making only the one tap coefficient corresponding to the center tap valid when performing said filtering during delay adjustment.

According to this aspect, the n-tap variable filter can be changed as necessary to 1 tap to change the filter characteristics, and thus it is possible to determine an even more optimum delay amount according to the delay adjustment conditions.

The above object of the present invention can be achieved by the the data reproduction apparatus of the present invention. The data reproduction apparatus that reproduces recorded data from a data-recording medium on which tracks are formed and comprising: a reproduction device of generating reproduction signals for the main track to be reproduced and for both of the adjacent tracks according to light that is reflected when light beams are irradiated at specified intervals in the tangential direction; a cross-talk removal device of extracting the cross-talk from the reproduction signal of one or the other or both of said adjacent tracks after delaying the reproduction signal from said main track and reproduction signals from said adjacent tracks a specified delay amount that corresponds to the difference in the respective reproduction time, and removes said cross-talk from the reproduction signal of said main track; a disturbance application device of applying a disturbance to the control signal required for reproducing said main track in order to increase said cross-talk; and a delay adjustment device of setting an optimum delay amount according to a specified signal that corresponds to said cross-talk when said delay amount is changed after said disturbance is applied, and performing delay adjustment for said cross-talk removal device.

According to this aspect, cross-talk is removed by a function similar to that of the present invention when reproducing data from a data-recording medium by the data reproduction apparatus, and the delay adjustment described above is performed at a specified timing. Therefore, it is possible to always maintain good reproducibility while at the same time remove cross-talk using an optimum delay amount.

In one aspect of the data reproduction apparatus of the present invention, said disturbance application device applies a disturbance to the control signal for a pick up when reproducing said main track.

According to this aspect, it is possible to remove cross-talk by performing delay adjustment with a function similar to that of the present invention when reproducing data from a data-recording medium by the data reproduction apparatus, and setting the delay to an optimum delay amount.

In another aspect of the data reproduction apparatus of the present invention, said disturbance application device applies a disturbance to the control signal for a pick up when reproducing said main track and said disturbance that is applied to said control signal is of a size such that there is no loss in error-correction performance during reproduction.

According to this aspect, it is possible to perform delay adjustment with a function similar to that of the present invention when reproducing data from a data-recording medium by the data reproduction apparatus, and to maintain good reproducibility without losing error correction performance.

In further aspect of the data reproduction apparatus of the present invention, said disturbance application device applies a disturbance to the control signal for a pick up when reproducing said main track and said control signal is the control signal for a tracking servo.

According to this aspect, it is possible to remove cross-talk by performing delay adjustment with a function similar to that of the present invention when reproducing data from a data-recording medium by the data reproduction apparatus, and adjusting the delay by increasing the cross-talk when using a tracking servo to set the delay to an optimum delay amount.

In further aspect of the data reproduction apparatus of the present invention, said delay adjustment device uses the jitter value from the output signal of said cross-talk removal device as said specified signal.

According to this aspect, it is possible to remove cross-talk by performing delay adjustment with a function similar to that of the present invention when reproducing data from a data-recording medium by the data reproduction apparatus, and setting the delay to a delay amount that will give the minimum jitter value.

In further aspect of the data reproduction apparatus of the present invention, said delay adjustment device performs delay adjustment at timing before the start of reproduction of said recorded data.

According to this aspect, the delay adjustment described above is performed at timing before the start of reproduction, such as when the power to the data reproduction apparatus is turned ON or when a data-recording medium is inserted into the data reproduction apparatus, so it is possible to start reproduction with an optimum delay amount that is set beforehand to correspond to effects due to changes in wavelength of the light source or the characteristics of the data-recording medium.

In further aspect of the data reproduction apparatus of the present invention, said delay adjustment device repeats delay adjustment at specified timing during reproduction of said recorded data.

According to this aspect, the delay adjustment described above is performed at each timing that exceeds, for example, a set specified time during the reproduction of the recorded data by the data reproduction apparatus, so it is possible to always set a proper delay amount even when the delay amount gradually changes due to changes in wavelength of the light source during reproduction.

In further aspect of the data reproduction apparatus of the present invention, said delay adjustment device performs a first delay adjustments at timing before the start of reproduction of said recorded data, and repeatedly performs a second delay adjustment at specified timing during reproduction of said recorded data, and which widens the range of change of said delay amount during said first delay adjustment, and narrows the range of change of said delay amount during said second delay adjustment.

According to this aspect, the size of the range of change of the delay amount is increased and delay adjustment is performed in the same way as in the present invention at timing before the start of reproduction by the data reproduction apparatus, and then the size of the range of change of the delay amount is decreased and delay adjustment is performed in the same way as in the present invention at a specified timing during reproduction of the recorded data. Therefore, when there are relatively large changes in the delay amount in the early stages, it is possible to properly adjust very minute changes in both directions of the delay amount during reproduction.

In further aspect of the data reproduction apparatus of the present invention, said cross-talk removal device has a variable filter that performs filtering using a variably controlled n number of tap coefficients and has a switching function for making only the one tap coefficient corresponding to the center tap valid when performing said filtering; and wherein said n number of tap coefficients are used for said variable filter when performing said first delay adjustment, and switches to make only the one tap coefficient corresponding to the center tap valid when performing said second delay adjustment.

According to this aspect, a variable filter that is constructed in the same way as in the present invention is used, and delay adjustment that is the same as that of present invention is performed by changing the variable filter from n taps to 1 tap when narrowing the delay adjustment, so the filter output, which corresponds to changes in cross-talk when the delay adjustment is narrow, changes sharply, so it is possible to easily determine the best delay amount.

DESCRIPTION OF THE PREFERRED EMBODIMENTS

The preferred embodiment of the present invention will be explained based on the drawings. In this embodiment, the case of applying the present invention to a data reproduction apparatus, which has a cross-talk removal apparatus and which reproduces data in DVD format from an optical disk and outputs that the user data, will be explained.

Figure 1:
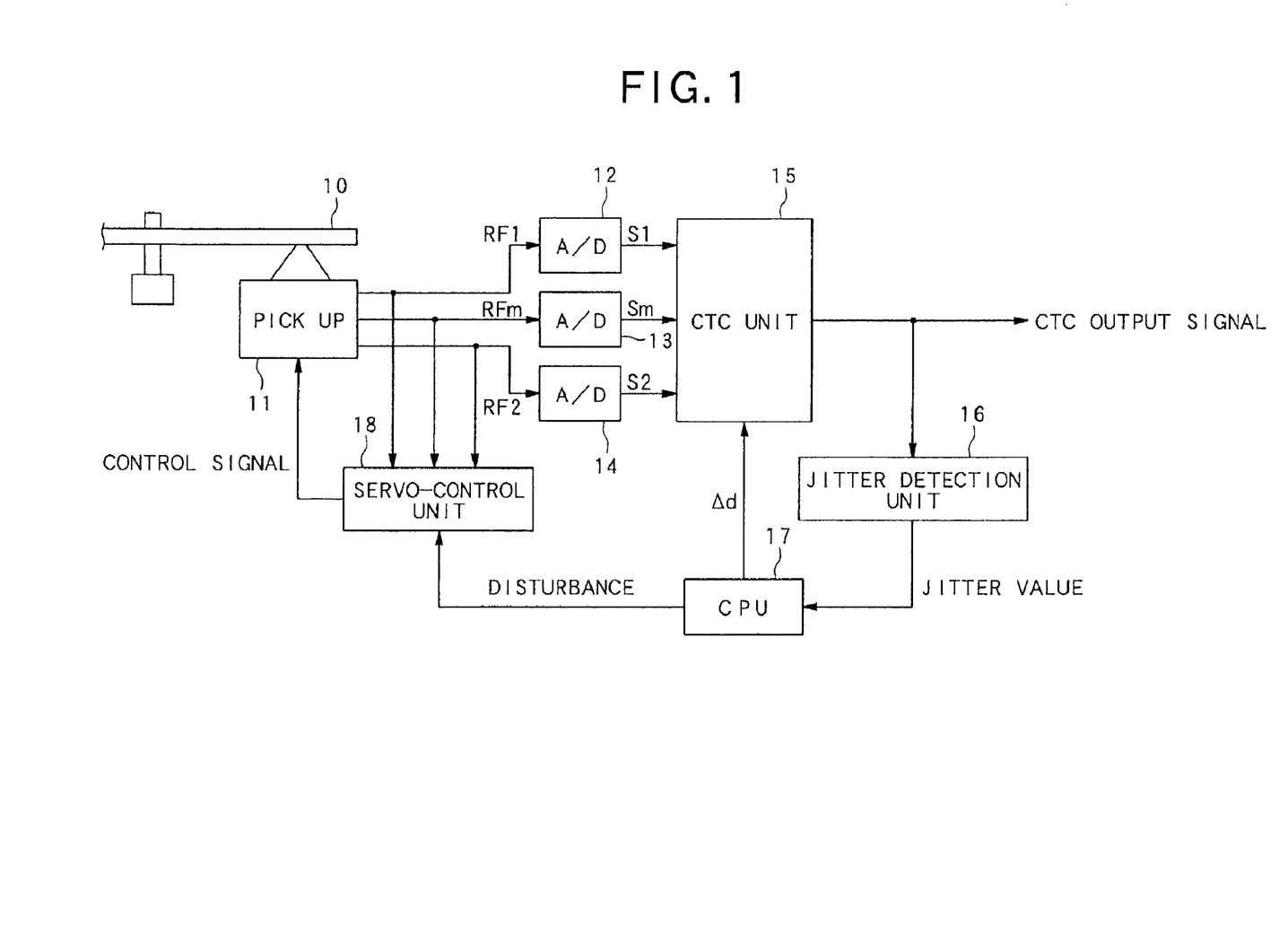
FIG. 1 is a block diagram that explains the main construction of the data reproduction apparatus of an embodiment of the present invention.

FIG. 1 is a block diagram that explains the main construction of the data reproduction apparatus of this embodiment. The data reproduction apparatus that is shown in FIG. 1 comprises: a pick up 11, A/D converters 12 to 14, CTC (Cross-talk Canceller) unit 15, jitter detection unit 16, CPU 17 and servo control unit 18, and it reproduces user data that are recorded on a disk 10 that is inserted into the data reproduction apparatus.

In this construction, the pick up 11 irradiates a light beam onto a track of the rotated disk 10, and generates a detection signal based on the reflected light. Also, in this embodiment, three light beams are irradiated from the pick up 11 onto three adjacent tracks of the disk 10, and by removing cross-talk from the track adjacent to the main track from which data are being reproduced, it is possible to improve the reproduction quality.

Figure 2:
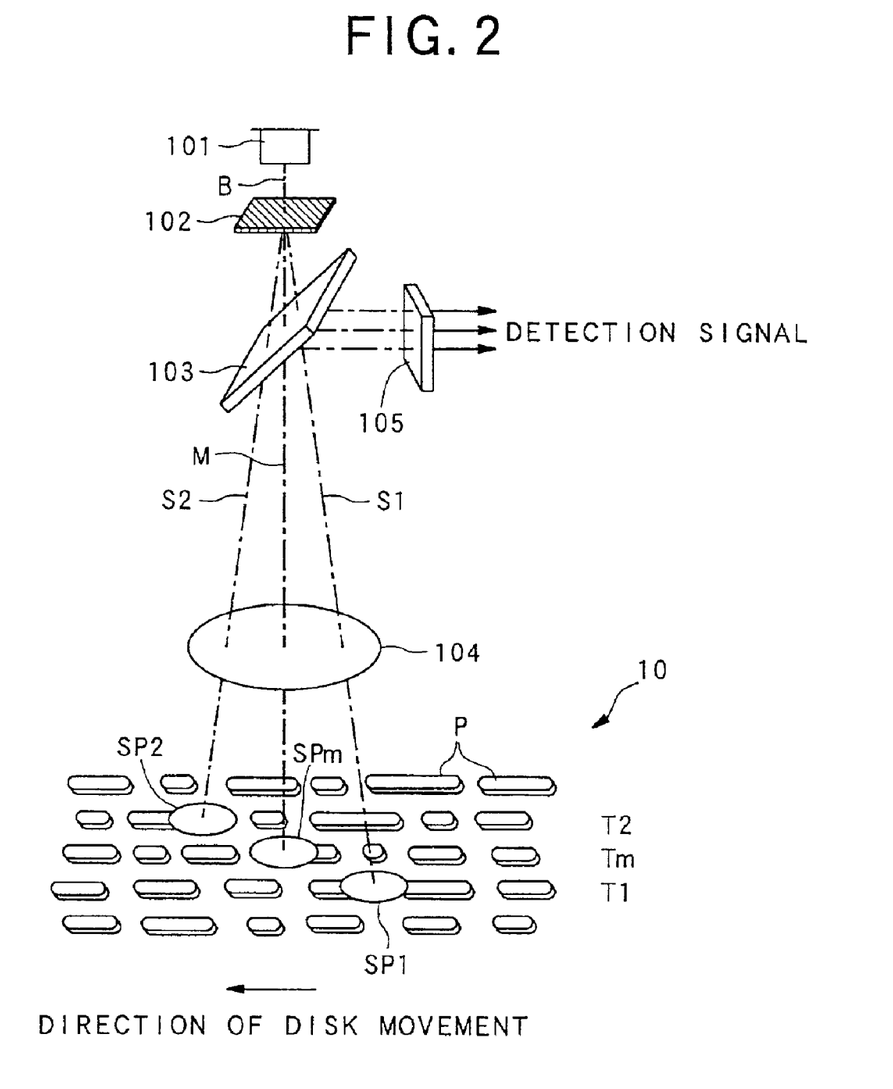
FIG. 2 is a diagram showing the optic system and light beams that are irradiated onto an optical disk for removing cross-talk.

FIG. 2 shows the optic system of the pick up 11 and light beams that are irradiated onto an optical disk 10 for removing cross-talk. As shown in FIG. 2, the optic system of the pick up 11 comprises: a laser 101, diffraction grating 102, beam splitter 103, object lens 104, and photo detector 105. In addition, tracks (T1, Tm, T2, etc.) are formed on the recording surface of the disk 10 at a fixed track pitch, and user data are recorded in pits P of the tracks.

In FIG. 2, the light beam B that is irradiated from the laser 101 is split into a main beam M and two sub beams S1, S2 by the action of the diffraction grating 102. These three beams pass through a beam splitter 103 and are irradiated onto three adjacent tracks on the recording surface of the disk 10 via the object lens 104. The main beam M is irradiated onto the main track Tm, which is the track from which data are to be reproduced, and forms a beam spot SPm. Also, one of the sub beams S1 is irradiated onto a track T1 that is adjacent to the main track Tm and forms a beam spot SP1, and the other sub beam S2 is irradiated onto another track T2 that is adjacent to the main track Tm and forms a beam spot SP2.

Moreover, the light reflected from the beam spot SPm due to the main beam M and the light reflected from the beam spots SP1, SP2 due to the sub beams S1, S2 each pass through the object lens 104 and are reflected by the beam splitter 103, then received by the photo detector 105. The photo detector 105 has a divided shape and in each division photo-electrically converts the reflected light and outputs detection signals. A reproduction signal RFm (see FIG. 1) for the main track, and reproduction signals RF1, RF2 (see FIG. 1) for the two adjacent tracks T1, T2 are generated based on the detection signals. The reproduction signals RF1, RF2 for the two adjacent tracks T1, T2 become necessary when removing the cross-talk component that is contained in the reproduction signal Rm for the main track Tm.

In FIG. 2, it is ideally preferred that the beam spot SPm from the main beam M and the beam spots SP1, SP2 from the two sub beams S1, S2 be arranged in a line in the radial direction of the disk, however, as shown in FIG. 2, in order that light from each of the beam spots SPm, SP1, SP2 can be received by different detectors, the beam spots SPm, SP1, SP2 are arranged in a diagonal straight line at specified intervals in the tangential direction of the tracks. Therefore, a delay occurs in the aforementioned reproduction signals RFm, RF1, RF2 that correspond to the intervals in the tangential direction of the disk between the spot beams SPm, SP1, SP2. This delay changes over time so it is necessary to adjust the delay of the reproduction signals RFm, RF1, RF2 at a specified timing, however details of the construction and operation will be explained later.

Next, in FIG. 1, the reproduction signals RFm, RF1, RF2 that are output from the pick up 11 are supplied to the servo-control unit 18 and A/D converters 12 to 14. The A/D converter 13 samples the reproduction signal RFm from the main track Tm and generates a sample-value series Sm, and the A/D converters 12, 14 sample the reproduction signals RF1, RF2 from the adjacent track T1, T2 and generate sample-value series S1, S2. The sample-value series Sm, S1, S2 that are generated by the A/D converters 12 to 14 are supplied to the CTC unit 15.

The CTC unit 15, which functions as the cross-talk removal device, performs a specified calculation process on the aforementioned sample-value series Sm, S1, S2, and generates a CTC output signal from which the effect of cross-talk from adjacent tracks has been removed. At this time, the CTC unit 17 comprises construction for correcting the delay between each of the reproduction signals RFm, RF1, RF2 as described above. Moreover, the delay amount Δd that is corrected when performing the delay adjustment process is set by the CPU17. Details of the construction and operation of the CTC unit 15 will be described later.

The jitter detection unit 16 detects jitter in the CTC output signal that is output from the CTC unit 15. This jitter is a parameter that expresses state of reproduction of the signal, and the value changes according to the effects of noise, interference between code, and cross-talk from adjacent tracks. A well known method is used as the method for detecting jitter by the jitter detection unit 16, however, it is also possible to use a jitter value that is an average exponential value that is calculated for the change from zero of the zero-cross sample value.

The CPU 17 performs overall control of the reproduction operation of the data reproduction apparatus. The CPU 17 determines the optimum delay amount Δd that is to be set for the CTC unit 15, and sets that delay amount Δd for the CTC unit 15 at the timing of the delay adjustment process to be described later. At this time, the CPU 17 applies a specified disturbance to a specified amount of control for the servo control unit 18, and determines the relationship between the jitter value obtained by the jitter detection unit 16 and the delay amount Δd in order to find the delay amount Δd for which the jitter value is a minimum. The CPU 17 functions as a device of applying a disturbance in this way, as well as functions as device for adjusting the delay amount together with the jitter detection unit 16. The delay adjustment process and disturbance will be described later.

The servo control unit 18 controls the actuator of the pick up 11, and it performs a focus servo control and tracking servo control during reproduction of data on the disk 10. The servo control unit 18 detects focus error and tracking error based on the reproduction signals Rm, R1, R2 that are supplied from the pick up 11, and controls the actuator by control signals that correspond to these. Also, during the delay adjustment process by the CTC unit 15, the CPU 17 adds disturbance to the control signal of the servo control unit 18.

Figure 3:
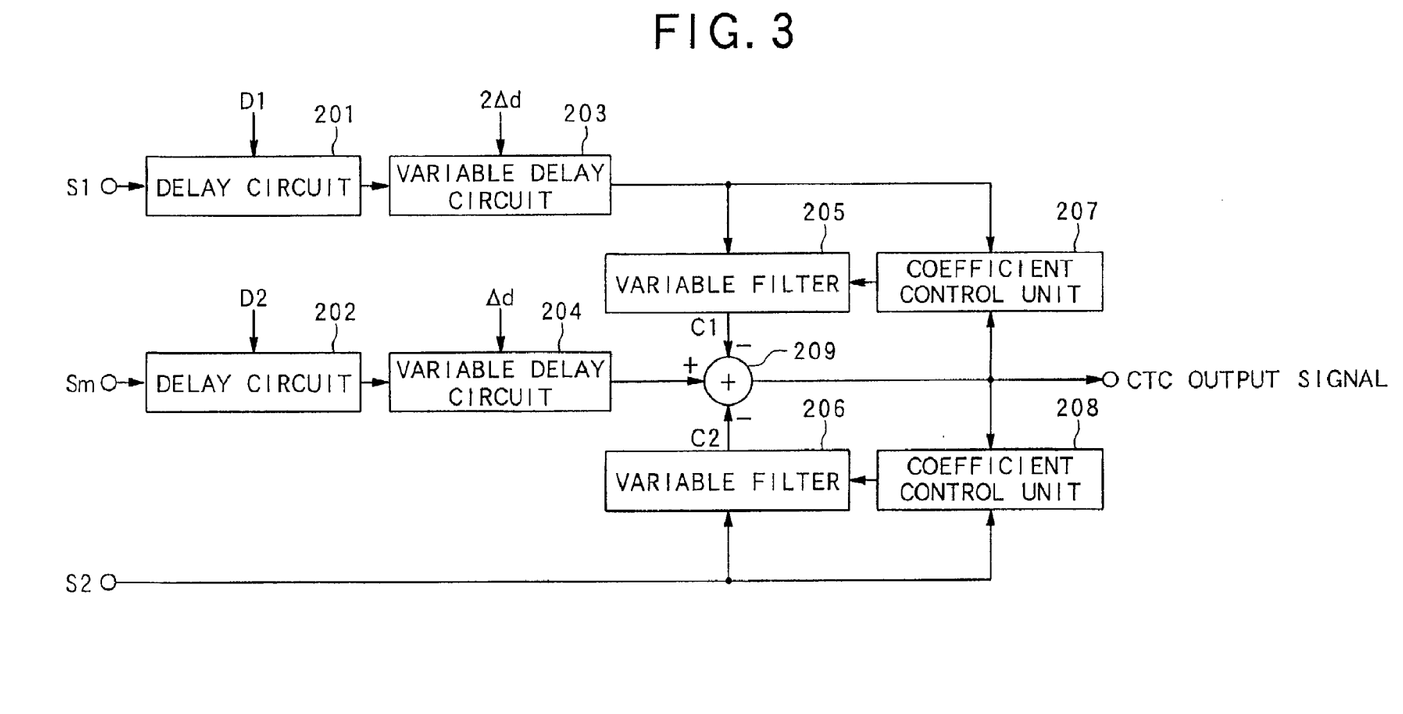
FIG. 3 is a block diagram showing a first example of the CTC unit.
Figure 4:
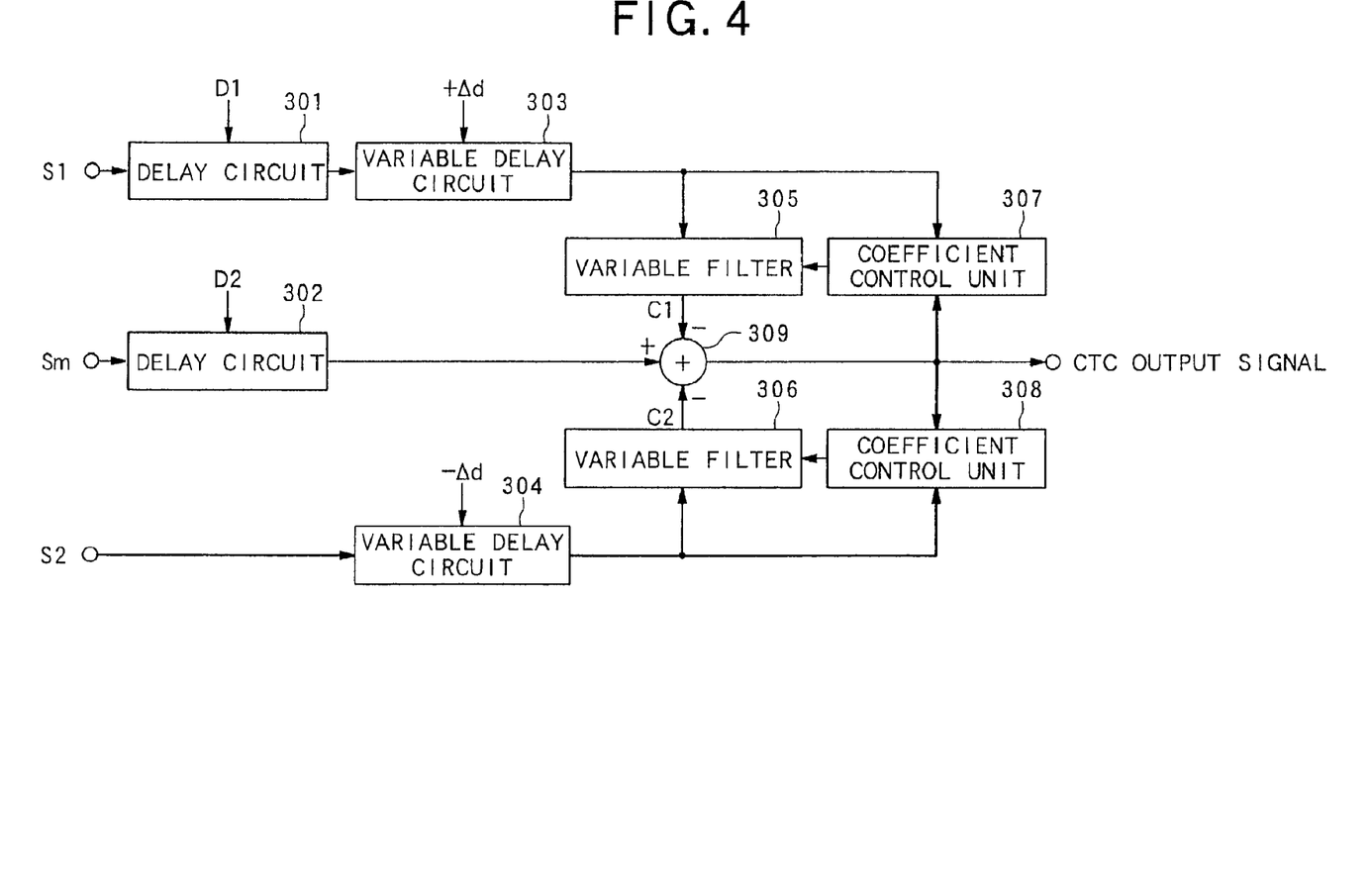
FIG. 4 is a block diagram showing a second example of the CTC unit.

Next, the construction and operation of the CTC unit 15 will be explained. FIG. 3 is a block diagram showing a first example of the construction of the CTC unit 15, and FIG. 4 is a block diagram showing a second example of the construction of the CTC unit 15.

First, the first example of construction shown in FIG. 3 will be explained. The example of the CTC unit 15 shown in FIG. 3 comprises: delay circuits 201, 202, variable delay circuits 203, 204, variable filters 205, 206, coefficient control units 207, 208 and an adder/subtractor 209. In this first example of construction, a sample-value series S2 that corresponds to the adjacent track T2 is taken to be a reference, and the delays of the sample-value series Sm that corresponds to the main track Tm and the sample-value series S1 that corresponds to the adjacent track T1 are adjusted.

In FIG. 3, the delay circuit 201 delays the sample-value series S1 that corresponds to the adjacent track T1 by a preset fixed delay amount D1 and then outputs the series. Similarly, the delay circuit 202 delays the sample-value series Sm that corresponds to the main track Tm by a preset fixed delay amount D2 and then outputs the series. The delay amounts D1, D2 in the delay circuits 201, 202 can be set to specified values that correspond to the intervals in the tangential direction of the disk from the beam spot SP2 shown in FIG. 1 to the respective beam spots SPm, SP1.

It is possible to use a FIFO (First In First Out) memory for the aforementioned delay circuits 201, 202. In this construction, control is performed such that the respective sample-value series S1, Sm that are input are stored in order in the FIFO memory, and after time corresponding to the delay amounts D1, D2 has elapsed, the sample-value series S1, Sm stored in memory are read and output.

The variable delay circuit 203 delays the sample-value series S1 that was delayed by the delay circuit 201 by a variable delay amount 2Δd that is set by the CPU 17 and then outputs the series. Similarly, the variable delay circuit 204 delays the sample-value series Sm that was delayed by the delay circuit 202 by a variable delay amount Δd that is set by the CPU 17 and then outputs the series. By having variable delay circuits 203, 204 that are separate from the fixed delay circuits 201, 202 in this way, it is not necessary to set the delay amount Δd to a large value when the aforementioned delay changes within a comparatively narrow range.

It is possible to use a shift register and selector circuit for the variable delay circuits 203, 204. In other words, the sample-value series are input in order into the shift register, and data at timing corresponding to the delay amounts 2Δd, Δd are then selected and output.

The intervals between the beam spots SP1, SPm, SP2 on the disk 10 change due to various reasons, so it is necessary to take that change into consideration and give a change width to the delay amount Δd. For example, the change could be caused by change over time of wavelength of the laser 101, or variations in the channel pit length of the disk 10. Neither of these cases is the cause of change in the delay within a short time, so the set delay amount Δd is effective only after a certain amount of time.

The delayed sample-value series S1 is input to the variable filter 205 while being shifted in order, then filtering by an n-tap filter that uses a variably controlled n number of tap coefficients is performed to calculate a cross-talk signal C1 that corresponds to the cross-talk component from the adjacent track T1. Moreover, the sample-value series S2 that corresponds to the adjacent track T2 is input to the variable filter 206 while being shifted in order, then filtering by an n-tap filter that uses a variably controlled n number of tap coefficients is performed to calculate a cross-talk signal C2 that corresponds to the cross-talk component from the adjacent track T2.

By increasing the number of taps n of the variable filters 205, 206, it is possible to perform even more precise filtering, and thus the ability for the CTC unit 15 to remove the cross-talk component is also improved by the CTC unit. However, by increasing the number of taps n, the construction of the variable filters 205, 206 becomes more complicated, and leads to an increase in the scale of the circuit of the CTC unit 15. Therefore, the variable filters 205, 206 are constructed with a suitable number of taps n, taking into consideration a balance between performance and circuit size.

Moreover, in considering the case of when the change width of the delay adjustment in the delay adjustment process to be described later is narrowed, it is possible to replace the n-tap variable filters 205, 206 described above with 1-tap construction. In this case, the variable filters 205, 206 receive a control signal from the CPU 17 and perform filtering with only one tap that corresponds to the center tap of the n tap coefficients being effective. Details of this switching function will be described later.

On the other hand, the coefficient-control unit 207 controls the tap coefficients of the variable filter 205 that corresponds to changes in cross-talk from the adjacent track T1. Similarly, the coefficient control unit 208 controls the tap coefficients for the variable filter 206 that correspond to cross-talk from the adjacent track T2. The CTC output signal together with the respective sample-value series S1, S2 are input to the coefficient control units 207, 208, and the coefficient control units 207, 208 determine the size of the cross-talk based on the shift from the zero cross of the CTC output signal. In addition, the coefficient control units 207, 208 gradually change the tap coefficients of the variable filters 205, 206 such that the cross-talk becomes a minimum.

The adder/subtractor 209 subtracts the cross-talk signal C1 that corresponds the adjacent track T1 and the cross-talk signal C2 that corresponds to the adjacent track T2 from the sample-value series S1 for which the delay corresponding to the main track Tm has been corrected, and then outputs the aforementioned CTC output signal. The cross-talk components from the adjacent tracks T1, T2 are removed in this way from the obtained CTC output signal with the condition that ideal filtering is performed.

Next, the second example of construction shown in FIG. 4 will be explained. The example of the construction of the CTC unit 15 shown in FIG. 4 comprises: delay circuits 301, 302, variable delay circuits 303, 304, variable filters 305, 306, coefficient control units 307, 308 and an adder/subtractor 309. In this second example of construction, the sample-value series Sm that corresponds to the main track Tm is taken to be a reference, and the delays of the sample-value series S1 that corresponds to the adjacent track T1 and the sample-value series S2 that corresponds to the adjacent track S2 are adjusted.

When comparing the construction shown in FIG. 4 with that shown in FIG. 3, the only difference is in the construction of delaying the sample-value series S1, Sm, S2 that correspond to the adjacent track T1, main track Tm and adjacent track T2, respectively. In other words, the sample-value series S1 that corresponds to the adjacent track T1 is delayed a fixed delay amount D1 by the delay circuit 301, then it is delayed a variable delay amount +Δd by the variable delay circuit 303 and then output. Also, the sample-value series Sm that corresponds to the main track Tm is delayed a fixed delay amount D2 by the delay circuit 302, and then is supplied to the adder/subtractor 209. The sample-value series S2 that corresponds to the adjacent track T2 is delayed a variable delay amount −Δd by the variable delay circuit 304 and then output.

The second example of construction is the same as the first example of construction except for this difference. Therefore, the basic operation of the CTC unit 15 is the same regardless of whether the first example or second example of construction is used. However, in the second example of construction, since only the codes are different and it is possible to use symmetric variable delay amounts +Δd and −Δd, control becomes easier.

Next, the delay adjustment process for the CTC unit 15 performed by the data reproduction apparatus of this embodiment will be explained with reference to FIG. 5 to FIG. 8. Here, two delay adjustment processes are shown that correspond to the timing at which the delay process is executed.

Figure 5:
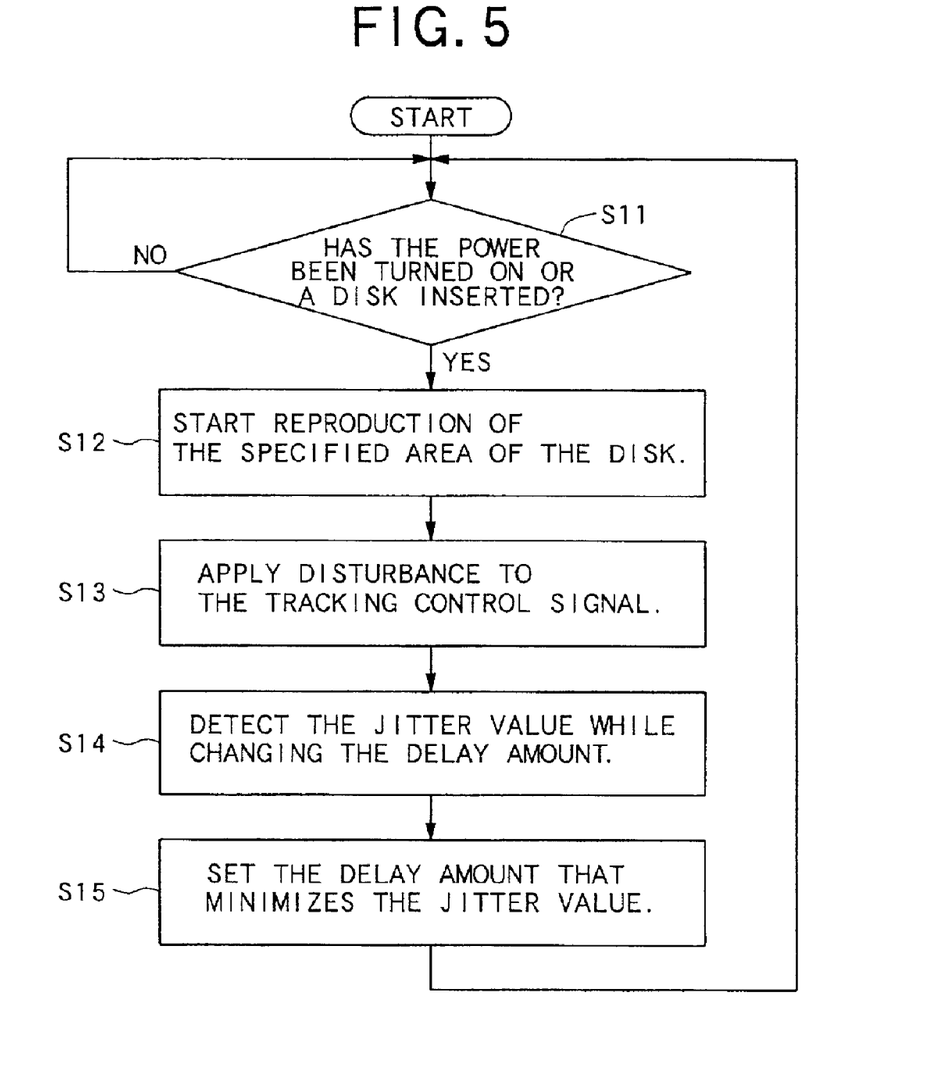
FIG. 5 is a flowchart showing a first delay adjustment process of an embodiment of the present invention.

FIG. 5 is a flowchart of the first delay adjustment process of this embodiment. This first delay adjustment process corresponds only to the case of performing delay adjustment for the CTC unit 15 when the power is turned ON or when a disk is changed.

First, the process shown in FIG. 5 monitors whether or not the power to the data reproduction apparatus has been turned ON, or whether or not a disk 10 has been inserted into the data reproduction apparatus (step S11). In other words, the first delay adjustment process is performed at timing when there is a large change in operating conditions due to changes in laser wavelength or variations in characteristics of the disk 10, such as when the power to the data reproduction apparatus is turned ON, or when the disk is replaced.

In step S11, when it is determined that the power to the data reproduction apparatus has been turned ON or that a disk has been inserted (step S11: Yes), the reproduction operation starts for a specified range of the disk 10 (step S12). In step S12, the lead-in area that is formed around the inside of a recordable DVD for example is reproduced. This lead-in area is the area accessed first during reproduction, and various kinds of control data that correspond to the actual recorded data are recorded in this area. In step S11, when it is determined that neither the power to the data reproduction apparatus has been turned ON nor that a disk has been inserted (step S11: No), monitoring continues.

Together with the aforementioned reproduction process, the CPU 17 applies disturbance to the tracking servo control signal of the servo control 18 (step S13). In other words, in order to set an optimum delay amount Δd for the CTC unit 15, it is necessary to increase the cross-talk component and enlarge the change width of the jitter value, and step 13 is the step in which disturbance is applied.

The case of adding disturbance to the tracking servo control signal is explained here, however, the present invention is not limited to this and it is also possible to apply disturbance to the focus servo control signal of the servo control unit 18. Also disturbance is not limited to being applied to the control signal for the actuator of a pick up 10, but can applied to control signal of a tilt servo. In this embodiment, as long as it is possible to increase the jitter value by applying a disturbance, the disturbance can be applied to various control signals that are required for the reproduction operation.

Also, it is possible to use various signals such as a periodic sine wave or random noise waveform as the disturbance applied to the control signal of the servo control unit 18, assuming it has the required amplitude. The waveform data used as the disturbance can be stored beforehand in a memory (not shown in the figures) that is controlled by the CPU 17 such that it is read and output when performing step S13.

Moreover, the amplitude of the waveform used as the disturbance must be kept at a level such that it will increase the cross-talk of the adjacent tracks T1, T2, while at the same time not reach a level at which the ability to perform error correction during reproduction would be lost. In the case of current DVD format, it is possible to sufficiently lower the error rate after error correction as long as the jitter value of the CTC output signal is less than approximately 15% when the disturbance is applied.

Figure 6:
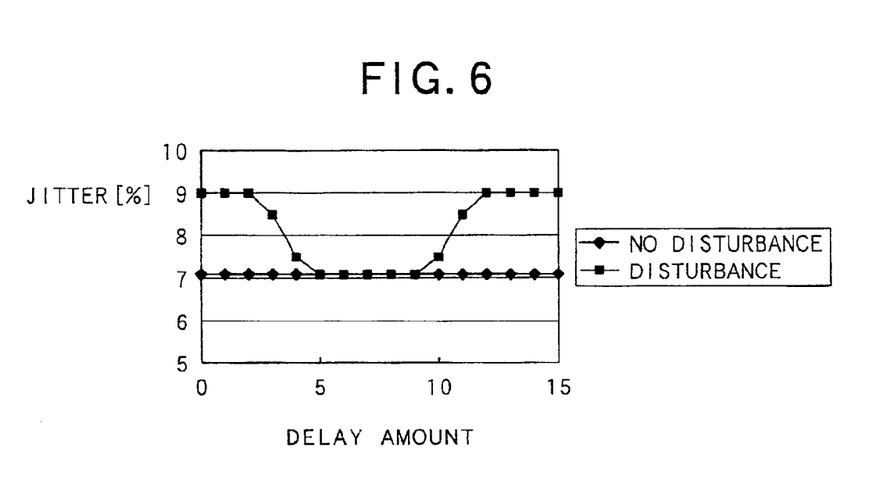
FIG. 6 is a diagram showing one example of the correspondence between the delay amount and jitter value in the first delay adjustment process of an embodiment of the present invention.

Next, the CPU 17 changes the delay amount $\Delta d$ for the CTC unit 15 within the specified range, then detects the jitter value by the jitter detection unit 16 to determine that change (step S14). FIG. 6 shows an example of the relationship between the delay amount $\Delta d$ and jitter value in this first delay adjustment process. FIG. 6 shows the change in the jitter value depending on whether or not there is disturbance when the variable filters of the CTC unit have 5 taps. The horizontal axis in FIG. 6 shows the delay amount $\Delta d$ that changes one block at a time in the range of 0 to 15 clock counts.

In FIG. 6, when the CPU 17 does not apply a disturbance, it can be seen that the jitter value hardly changes at all over the entire range of change of the delay amount $\Delta d$ (shown by the plot of round circles). This is reflected on the fact that when a stable reproduction operation is steadily performed, there is little cross-talk component between the adjacent tracks T1, T2 and the main track Tm, so the corresponding jitter value becomes small.

On the other hand, when disturbance is applied by the CPU 17, it can be seen that the jitter value changes over the range of change of the delay amount $\Delta d$. In other words, the actuator of the pick up 10 oscillates due to the disturbance that is applied to the control signal of the tracking servo, so the cross-talk component between the adjacent tracks T1, T2 and the main track Tm increases due to de-tracking, and the corresponding jitter value becomes large.

By intentionally increasing the cross-talk component by applying a disturbance in this way, it is possible to cause the jitter value, which normally has small change, to change a lot over the range of change of the delay amount $\Delta d$. As a result, this is very efficient from the aspect that it is possible to easily set the optimum delay amount $\Delta d$.

Next, in FIG. 5, after the jitter value has been detected within the range of change of the delay amount $\Delta d$ as described above, the delay amount $\Delta d$ that results in the minimum jitter value is determined and that value is set for the CTC unit 15 (step S15). Here, as shown in FIG. 6, the jitter value becomes a minimum in for a few clock counts in the center of the range of change of the delay amount $\Delta d$ (5 to 9 on the horizontal axis in FIG. 6). In other words, in accordance to the tap configuration of the variable filters of the CTC unit 15, the range for which the jitter value becomes a minimum is spread over 5 taps. In this case, the center delay amount $\Delta d$ in the range where the jitter value becomes a minimum is set. In the example shown in FIG. 6, $\Delta d=7$ can be set as the center value in the range 5 to 9 on the horizontal axis.

Figure 7:
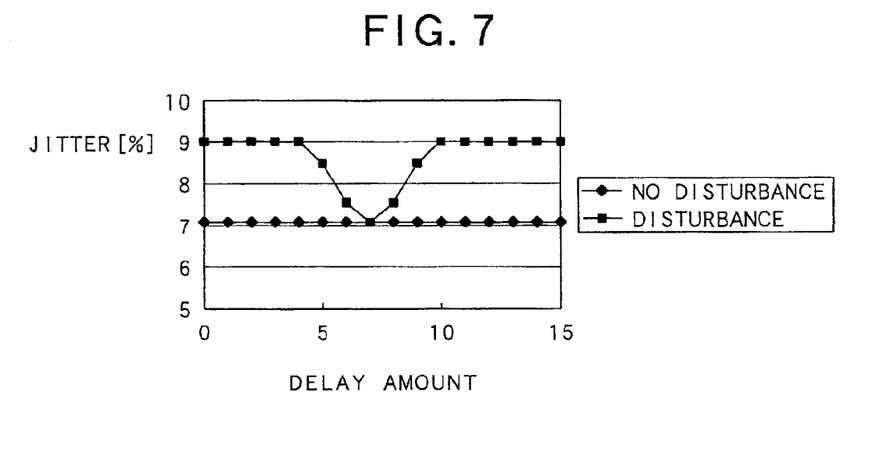
FIG. 7 is a diagram showing another example of the correspondence between the delay amount and jitter value in the first delay adjustment process of an embodiment of the present invention.

It is also possible to configure the variable filters of the CTC unit 15 with one tap. FIG. 7 shows the change in the jitter value according to whether or not there is disturbance in the case of 1-tap variable filters for the CTC unit 15, and the plot is expressed in the same way as in FIG. 6. In FIG. 7, when the CPU 17 does not apply a disturbance, the fact that the jitter value does not change over the entire range of change of the delay amount $\Delta d$ is the same as in the case of FIG. 6 (plot is shown by square marks).

When the CPU 17 applies a disturbance, the jitter value changes over the range of change of the delay amount $\Delta d$, however, it can be seen that the change is steeper than the change shown in FIG. 6. In this case, by switching the variable filters of the CTC unit 15 to 1-tap filters, the jitter value is a minimum only at the position that corresponds to the proper delay amount $\Delta d$. Therefore, it is possible to precisely adjust the delay amount $\Delta d$ by change the delay amount $\Delta d$ within a narrow range.

When the delay amount $\Delta d$ has been set in step S15, the process returns to step S11 and waits for the power to be turned ON again after being turned OFF, or waits for a new disk 10 to be inserted. The delay adjustment process of steps S11 to S15 is then executed every time the power is turned ON or a disk is inserted after that.

In the first delay adjustment process described above, the optimum delay amount $\Delta d$ is set for the CTC unit 15 when the delay between reproduction signals that corresponds to the three light beams that are irradiated onto the disk 10 changes greatly when the data reproduction apparatus is activated or when a disk is exchanged. Therefore it is possible to set an optimum delay amount $\Delta d$ and remove the cross-talk before the reproduction operation is performed even when the laser wavelength changes or when characteristics of the channel bit length of the disk 10 differ.

Figure 8:
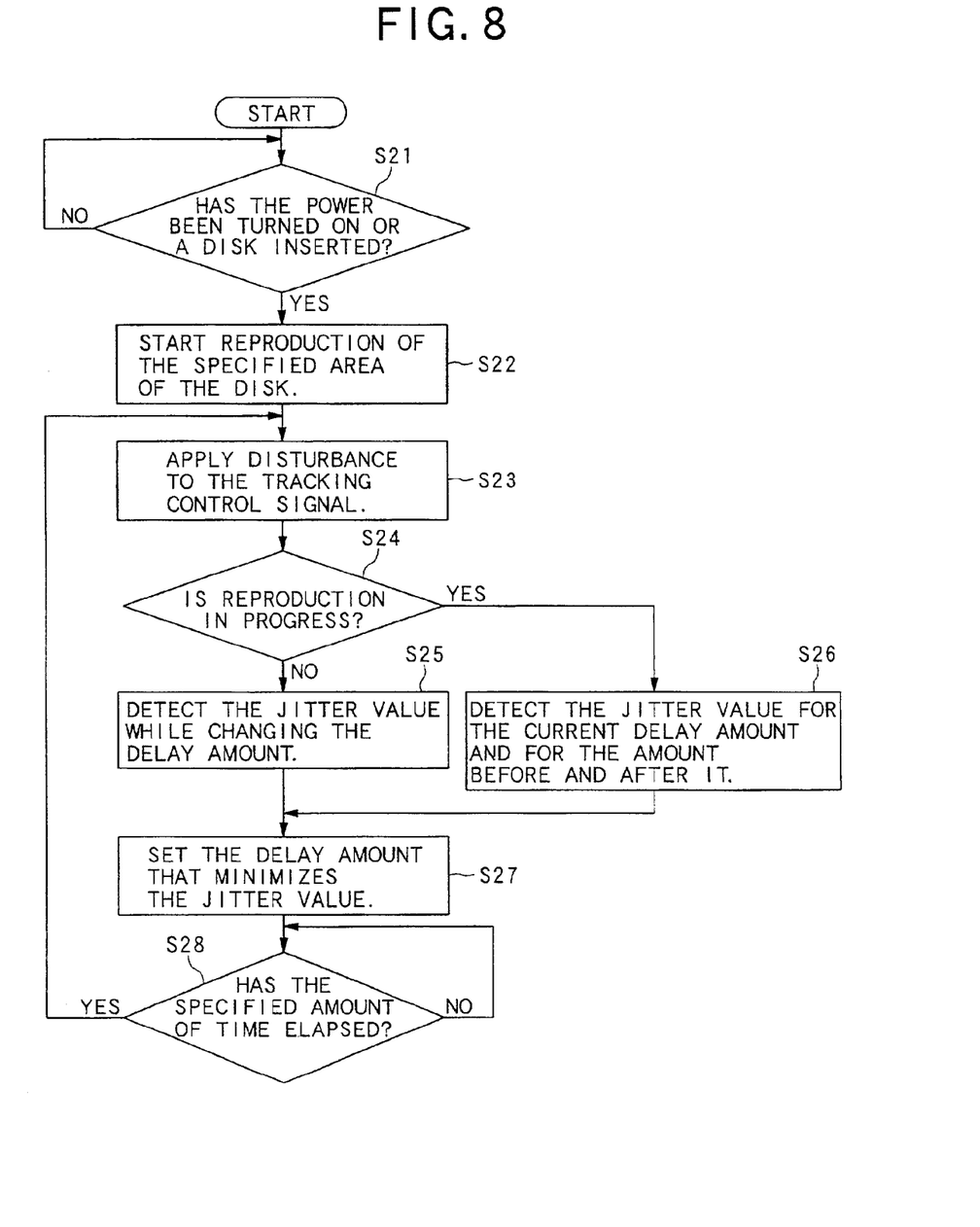
FIG. 8 is a flowchart showing a second delay adjustment process of an embodiment of the present invention.

Next, FIG. 8 is a flowchart showing a second delay adjustment process of this embodiment. This second delay adjustment process corresponds to when delay adjustment is performed for the CTC unit 15 at specified timing during reproduction of the disk 10 in addition to when the power is turned ON or when the disk is exchanged.

First, the process shown in FIG. 8 monitors whether or not the power to the data reproduction apparatus is turned ON, or whether or not a disk 10 is inserted into the data reproduction apparatus (step S21). In the initial step, delay adjustment is performed in this way at the same timing as in step S11 of the first delay adjustment process.

Next, starting the reproduction process for a specified area on the disk 10 (step S22), and applying a disturbance to the control signal of the tracking servo of the servo-control unit 18 (step S23) are both performed in the same way as steps S12 and S13 of the first delay adjustment process.

Next, before detecting the jitter value when changing the delay amount $\Delta d$ for the CTC unit 15 within a specified range, the process determines whether or not reproduction of the disk 10 is in progress (step S24). The reason for this step S24 is that it is necessary to widen the range of change of the delay amount $\Delta d$ when the power has been turned ON or when a disk has been inserted, however on the other hand, in order to minimize the effects on the reproduction process, it is necessary to narrow the range of change of the delay amount Δd when starting to reproduce the disk 10.

When the result of the judgment in step S24 is that reproduction of the disk 10 is not in progress (step S24: NO), the CPU 17 changes the delay amount Δd within a wide range, then detects the jitter value by the jitter detection unit 16 and determines that change (step S25). In this case, step S25 can be the same as step S14 in the first delay adjustment process. On the other hand, when the result of the judgment in step S24 is that reproduction of the disk 10 is in progress (step S24: YES), the CPU 17 narrows the range of change of the delay amount Δd, and for example, changes the delay amount Δd at two points before and after the current delay amount Δd, then detects the jitter value by the jitter detection unit 16 and determines that change (step S26). The variable filters of the CTC unit 15 can be 5-tap filters in step S25, and should switch to 1-tap filters in step S26.

Next, after the jitter value has been detected within the range of change of the delay amount Δd as described above, the delay amount Δd that minimizes the jitter value is determined and is set for the CTC unit 15 (step S27). When the range of change of the delay amount Δd is wide in step S25, the delay amount Δd is set, for example, to Δd=7 in FIG. 7. On the other hand, when the range of change of the delay amount Δd is narrow in step S26, the delay amount Δd is selectively set, for example, for three points where the jitter value is a minimum, including the current delay amount Δd and the points before and after it.

After setting the delay amount Δd in step S27, the CPU 17 uses a timing device of determining whether or not a specified amount of time has elapsed (step S28). As a result, when it is determined that the specified amount of time has elapsed (step S28: YES), the process from step S23 is executed again, however when it is determined that the specified amount of time has not elapsed (step S28: NO), the judgment process of step S28 continues.

In the second delay adjustment process explained above, the delay amount Δd is finely adjusted a little at a time even when reproduction of the disk 10 is in progress. This makes it possible to remove the cross-talk while at the same time constantly maintain the proper delay amount Δd even when the delay of the reproduction signals RFm, RF1, RF2 change due to changes in the laser wavelength during reproduction. Since the variable filters of the CTC unit 15 are constructed as shown in FIG. 7 such that they switch to a 1-tap configuration at this time, it is possible to easily determine the minimum jitter value and properly set the delay amount Δd, even when the range of change of the delay amount Δd is small.

In the embodiment described above, applying the present invention to a data reproduction apparatus that reproduces data on an optical disk using DVD format was explained, however, the present invention is not limited to this, and it is possible to widely apply the present invention to a data reproduction apparatus that uses a data recording medium of various formats on which tracks are formed.

Also, in this embodiment, applying the present invention to construction that uses a light beam that is separated into three beams is explained, however, the present invention is not limited to this, and it is possible to apply the present invention to construction that used a light beam that is separated into more than three beams, for example, five light beams.

According to the present invention explained above, a disturbance is applied to the control signal required for the reproduction operation when adjusting the amount to delay the reproduction signals for main track and adjacent tracks when removing the cross-talk, so by intentionally increasing the cross-talk, it is possible to easily find the optimum delay amount and precisely remove the cross-talk, even when the steady cross-talk during reproduction is small.

The entire disclosure of Japanese Patent Application No. 2001-97665 filed on Mar. 29, 2001 including the specification, claims, drawings and summary is incorporated herein by reference in its entirety.

What is claimed is:

1. A cross-talk removal apparatus that removes cross-talk between the reproduction signal from a main track on a data-recording medium that is to be reproduced, and one or the other or both of the reproduction signals from the adjacent tracks and comprising:

a cross-talk removal device of extracting the cross-talk from the reproduction signal of one or the other or both of said adjacent tracks after delaying the reproduction signal from said main track and reproduction signals from said adjacent tracks a specified delay amount that corresponds to the difference in the respective reproduction time, and removes said cross-talk from the reproduction signal of said main track;

a disturbance application device of applying a disturbance to the control signal required for reproducing said main track in order to increase said cross-talk; and a delay adjustment device of setting an optimum delay amount according to a specified signal that corresponds to said cross-talk when said delay amount is changed after said disturbance is applied, and performing delay adjustment for said cross-talk removal device.

2. The cross-talk removal apparatus of claim 1 wherein;

said disturbance application device applies a disturbance to the control signal for a pick up when reproducing said main track.

3. The cross-talk removal apparatus of claim 2 wherein;

said disturbance that is applied to said control signal is of a size such that there is no loss in error-correction performance during reproduction.

4. The cross-talk removal apparatus of claim 2 wherein;

said control signal is the control signal for a tracking servo.

5. The cross-talk removal apparatus of claim 1 wherein;

said delay adjustment device uses the jitter value from the output signal of said cross-talk removal device as said specified signal.

6. The cross-talk removal apparatus of claim 1 further comprising a variable filter that uses a variably controlled n number of tap coefficients for performing filtering.

7. The cross-talk removal apparatus of claim 6 wherein;

said variable filter has a switching function for making only the one tap coefficient corresponding to the center tap valid when performing said filtering during delay adjustment.

8. A data reproduction apparatus that reproduces recorded data from a data-recording medium on which tracks are formed and comprising:

a reproduction device of generating reproduction signals for the main track to be reproduced and for both of the adjacent tracks according to light that is reflected when light beams are irradiated at specified intervals in the tangential direction;

a cross-talk removal device of extracting the cross-talk from the reproduction signal of one or the other or both of said adjacent tracks after delaying the reproduction signal from said main track and reproduction signals from said adjacent tracks a specified delay amount that corresponds to the difference in the respective reproduction time, and removes said cross-talk from the reproduction signal of said main track;

a disturbance application device of applying a disturbance to the control signal required for reproducing said main track in order to increase said cross-talk; and a delay adjustment device of setting an optimum delay amount according to a specified signal that corresponds to said cross-talk when said delay amount is changed after said disturbance is applied, and performing delay adjustment for said cross-talk removal device.

9. The data reproduction apparatus of claim 8 wherein;

said disturbance application device applies a disturbance to the control signal for a pick up when reproducing said main track.

10. The data reproduction apparatus of claim 9 wherein;

said disturbance that is applied to said control signal is of a size such that there is no loss in error-correction performance during reproduction.

11. The data reproduction apparatus of claim 9 wherein;

said control signal is the control signal for a tracking servo.

12. The data reproduction apparatus of claim 8 wherein;

said delay adjustment device uses the jitter value from the output signal of said cross-talk removal device as said specified signal.

13. The data reproduction apparatus of claim 8 wherein;

said delay adjustment device performs delay adjustment at timing before the start of reproduction of said recorded data.

14. The data reproduction apparatus of claim 8 wherein;

said delay adjustment device repeats delay adjustment at specified timing during reproduction of said recorded data.

15. The data reproduction apparatus of claim 8 wherein;

said delay adjustment device performs a first delay adjustments at timing before the start of reproduction of said recorded data, and repeatedly performs a second delay adjustment at specified timing during reproduction of said recorded data, and which widens the range of change of said delay amount during said first delay adjustment, and narrows the range of change of said delay amount during said second delay adjustment.

16. The data reproduction apparatus of claim 15 wherein;

said cross-talk removal device has a variable filter that performs filtering using a variably controlled n number of tap coefficients and has a switching function for making only the one tap coefficient corresponding to the center tap valid when performing said filtering; and wherein said n number of tap coefficients are used for said variable filter when performing said first delay adjustment, and switches to make only the one tap coefficient corresponding to the center tap valid when performing said second delay adjustment.

* * * * *